United States Patent
Sugiura (10) Patent No.: US 8,004,728 B2
(45) Date of Patent: Aug. 23, 2011

(54) IMAGE SCANNING DEVICE (75) Inventor: Kazuhiko Sugiura, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 936 days.

(21) Appl. No.: 11/947,316

(22) Filed: Nov. 29, 2007

(65) Prior Publication Data

US 2008/0123162 A1 May 29, 2008

(30) Foreign Application Priority Data

Nov. 29, 2006 (JP) ................................. 2006-322171
Nov. 15, 2007 (JP) ................................. 2007-296697

(51) Int. Cl.
*H04N 1/04* (2006.01)
(52) U.S. Cl. ......... 358/498; 358/474; 358/448; 358/501
(58) Field of Classification Search .................. 358/498, 358/474, 448, 501, 515
See application file for complete search history.

(56) References Cited

U.S. PATENT DOCUMENTS

| 5,321,470 | A | 6/1994 | Hasuo et al. |
| 5,434,649 | A | 7/1995 | Hasuo et al. |
| 5,583,614 | A | 12/1996 | Hasuo et al. |
| 5,765,089 | A | 6/1998 | Hasuo et al. |
| 6,185,404 | B1 * | 2/2001 | Hasuo et al. ................... 399/366 |
| 7,551,331 | B2 * | 6/2009 | Ishimaru et al. ............... 358/496 |
| 2007/0183002 | A1 * | 8/2007 | Corona ........................ 358/474 |

FOREIGN PATENT DOCUMENTS

| CN | 149738 A | 5/2004 |
| JP | 1-316783 | 12/1989 |
| JP | 2000-339403 | 12/2000 |
| JP | 2001-94772 | 4/2001 |
| JP | 2001-312691 | 11/2001 |

OTHER PUBLICATIONS

Chinese Official Action dated Nov. 20, 2009 with English translation.

* cited by examiner

*Primary Examiner* — Houshang Safaipour
(74) *Attorney, Agent, or Firm* — Scully, Scott, Murphy & Presser, P.C.

(57) ABSTRACT

An image scanning device has a scanning unit, a first storage unit, a first determination unit, and a control unit. The scanning unit scans an original document to produce image data. The first storage unit stores a specific condition used by the scanning unit for scanning a specific document. The specific document requires a limited scanning condition. The first determination unit determines based on the image data whether the original document is the specific document. The control unit reads the specific condition from the first storage unit and causes the scanning unit to scan the original document with the specific condition if the first determination unit determines that the original document is the specific document.

19 Claims, 7 Drawing Sheets

IMAGE SCANNING DEVICE

CROSS REFERENCE TO RELATED APPLICATION

This application claims priority from Japanese Patent Application No. 2006-322171 filed Nov. 29, 2006 and Japanese Patent Application No. 2007-296697 filed Nov. 15, 2007. The entire content of each of these priority applications is incorporated herein by reference.

TECHNICAL FIELD

The present invention relates to an image scanning device.

BACKGROUND

In recent years, documents such as tax-related and financial documents which private companies are required to archive have been legally allowed to be stored in electric files. Furthermore, image data produced by scanning an original document by a scanner is also accepted as the original, if the produced image data satisfies a resolution and a gradation more than predetermined standard. This trend is expected to reduce the cost required for archiving paper documents.

Japanese Patent Publication H01-316783 discloses an image processing device which converts the image data obtained by scanning an original document into another format if the image data matches one of the bank bills and the securities which have been stored in the image processing device. In other words, if the original document is scanned with the scanning conditions which do not support the bank bills and/or the securities, this method can prevent the bank bills and the securities from being forged.

However, a user sometimes erroneously scans the original document with an inappropriate scanning conditions such as a resolution and gradation to produce image data. In this case, the user does not notice the mistake at that time, but the user finds out the mistake when the user tries to use the image data.

It is a first object of the present invention to provide an image scanning device which scans a specific document with a specific condition which is appropriate for the specific document.

It is a second object of the present invention to provide an image scanning device which reduces an erroneous scanning condition for scanning the original document.

SUMMARY

The present invention provides an image scanning device having a scanning unit, a first storage unit, a first determination unit, and a control unit. The scanning unit scans an original document to produce image data. The first storage unit stores a specific condition used by the scanning unit for scanning a specific document. The specific document requires a limited scanning condition. The first determination unit determines based on the image data whether the original document is the specific document. The control unit reads the specific condition from the first storage unit and causes the scanning unit to scan the original document with the specific condition if the first determination unit determines that the original document is the specific document.

The present invention provides an image scanning system having an image scanning device and an information processing device. The image scanning device has a scanning unit that scans an original document to produce image data. The information processing device communicates with the image scanning device bidirectionally. The information processing device has a storage unit, a determination unit, and a control unit. The storage unit stores a specific condition used by the scanning unit for scanning a specific document, the specific document requiring a limited scanning condition. The determination unit causes the scanning unit to scan the original document with an initial condition to produce initial image data and then determines based on the initial image data whether the original document is the specific document. The control unit reads the specific condition from the storage unit and causes the scanning unit to scan the original document with the specific condition if the determination unit determines that the original document is the specific document.

The present invention provides an image scanning device having a scanning unit, a user setting unit, a storage unit, a determination unit, and a control unit. The scanning unit scans an original document to produce image data. The user setting unit receives a user setting condition set by a user, the user setting condition being used by the scanning unit for scanning the original document. The storage unit stores a specific condition used by the scanning unit for scanning a specific document, the specific document requiring a limited scanning condition. The determination unit causes the scanning unit to scan the original document with an initial condition to produce initial image data and then determines, based on the initial image data, whether the original document is the specific document. The control unit reads the specific condition from the storage unit and then causes the scanning unit to scan the original document with the specific condition if the determination unit determines that the original document is the specific document.

The present invention provides an image scanning system having an image scanning device and an information processing device. The image scanning device has a scanning unit that scan an original document to produce image data. The information processing device communicating with the image scanning device bidirectionally. The information processing device has a user setting unit, a storage unit, a determination unit, and a control unit. The user setting unit receives a user setting condition set by a user. The storage unit stores a specific condition used by the scanning unit for scanning a specific document, the specific document requiring a limited scanning condition. The determination unit causes the scanning unit to scan the original document with an initial condition to produce initial image data, and then determines, based on the initial image data, whether the original document is the specific document. The control unit reads the specific condition from the storage unit, and then causes the scanning unit to scan the original document with the specific condition instead of the user setting condition if the determination unit determines that the original document is the specific document.

BRIEF DESCRIPTION OF THE DRAWINGS

The particular features and advantages of the invention as well as other objects will become apparent from the following description taken in connection with the accompanying drawings, in which.

DETAILED DESCRIPTION

Embodiments according to the present invention will be described with reference to the drawings.

Figure 1:
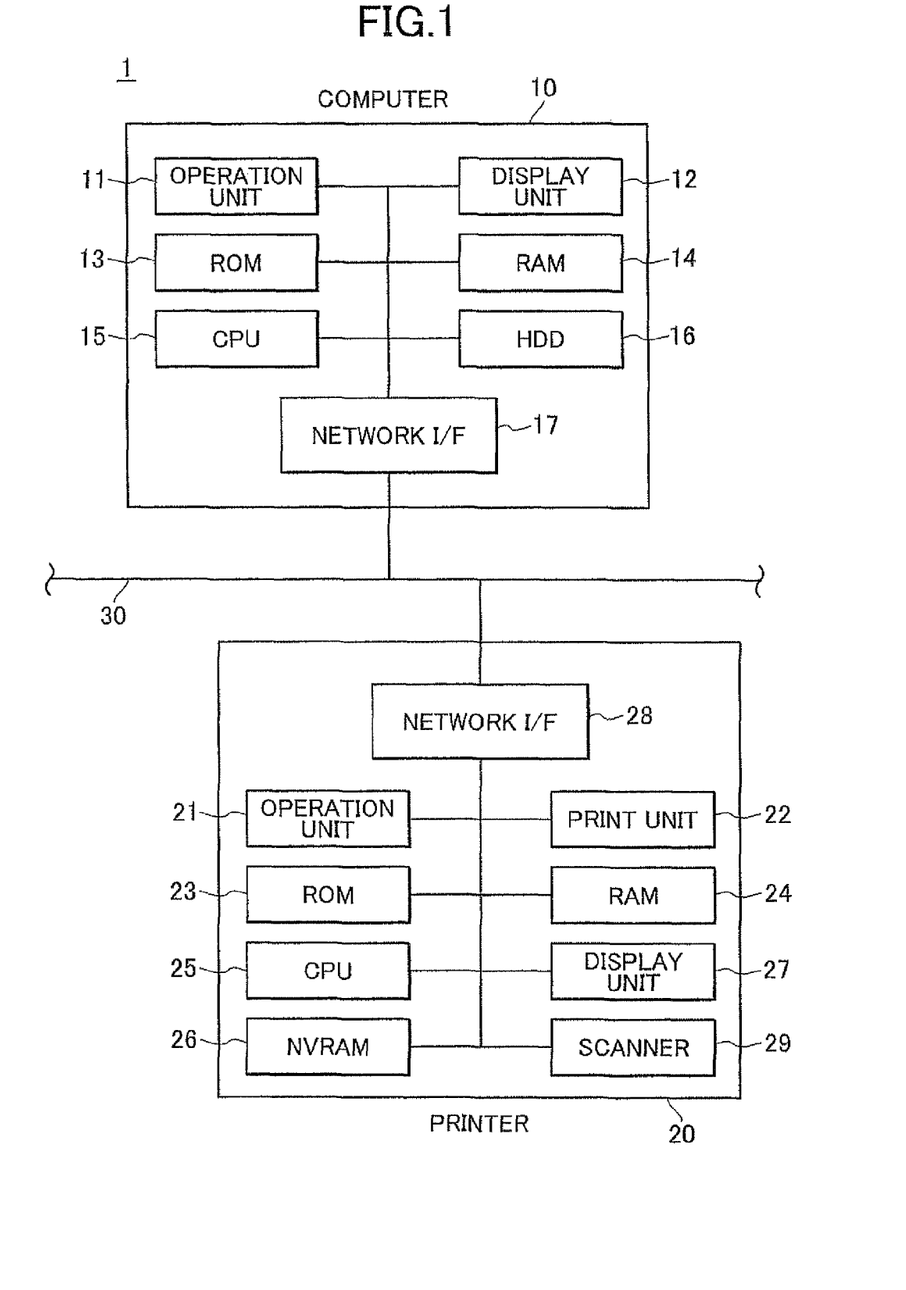
FIG. 1 is a block diagram showing an image scanning system according to the present invention.

Referring to FIG. 1, an image scanning system 1 includes a computer 10 and a printer 20 connected to the computer 10 through a communication line 30 such as a LAN cable.

The computer 10 includes an operation unit 11 for entering a command from outside; a display unit 12 made from a liquid crystal display panel; a read only memory (ROM) 13; a random access memory (RAM) 14; a central processing unit (CPU) 15; a hard disk 16; and a network interface 17 connectable to the communication line 30, which are connected to one another by a bus. The hard disk 16 stores software programs including an application program and a printer driver for the printer 20. The CPU 15 reads the software program from the hard disk 16 and then executes the software program, according to the command entered from the operation unit 11.

The printer 20 includes an operation unit 21 having keys; a printing unit 22 for printing on a sheet; a ROM 23; a RAM 24; a CPU 25; a nonvolatile memory (NVRAM) 26; a display unit 27 made from a liquid crystal display panel; a network interface 28; and a scanning unit 29, which are connected to one another by a bus. The CPU 25 performs processing according to the program stored in the ROM 23, and stores the processing result in the RAM 24 or the NVRAM 26. The scanning unit 29 scans an original document and produces image data of the original document. The network interface 28 is connected to the communication line 30, so that the printer 20 receives a scanning command and a setting for a scanning condition and transmits image data to an external device through the network interface 28.

Next, a scanning process performed by the printer 20 will be described.

In the printer 20, the RAM 24 stores the setting values to be used by the scanning process. The setting values are displayed on the display unit 27. Referring to the displayed values, a user can change the setting values through the operation unit 21. The user starts a scanning process, with entering a command through the operation unit 21.

On the other hand, in the computer 10, the user activates the printer driver through the operation unit 11. Referring to the displayed setting values on the display unit 12, the user confirms the setting values for the scanning process, and then enters a scanning command to start the scanning process. In response to the scanning command, the setting values are transmitted to the printer 20 together with the scanning command.

The setting values for the scanning include a scanning condition, an output file format, an output destination, and various types of information for the scanning. The scanning condition includes a resolution, gradation, color information, and other various values to be used by the scanning unit 29 to produce image data. For example, the resolution is selected from the following plural values including 150 dpi, 200 dpi, 300 dpi, and 400 dpi. Furthermore, the color information is selected from the following plural color modes including monochrome (2 values), 256 level color, and multi-color with each RGB having 256 levels.

When the scanning command is entered from the operation unit 21 or received through the network interface 28 from the computer 10, the scanning process is started by the CPU 25 after an original document is set in the scanning unit 29.

Figure 2:
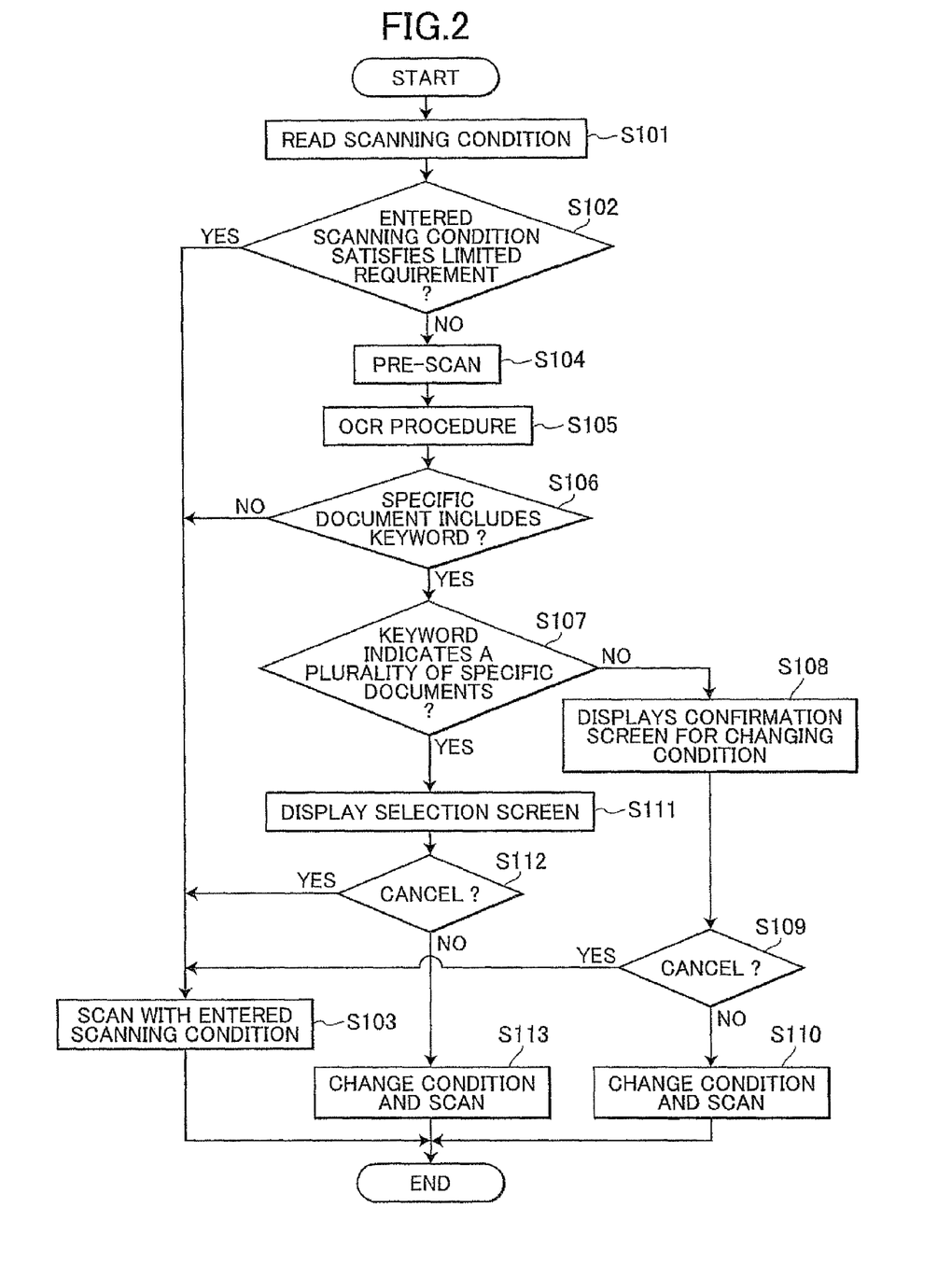
FIG. 2 is a flowchart showing a scanning process including a step which determines whether an original document is a specific document.

Referring to FIG. 2, as the scanning process is started, the CPU 25 reads the setting values which have been entered for scanning (S101). When a scanning command is entered from the operation unit 21 of the printer 20 by the user, the setting values are the setting values which have been entered by the user and stored in the RAM 24. Alternatively, when the scanning command is transmitted from the computer 10, the setting values are the setting values which have been received with the command. In this case, the entered scanning condition consists of an entered resolution, an entered gradation, and entered color information of polychrome or monochrome. The CPU 25 then determines whether the entered scanning condition included in the read setting values satisfies the following prescribed requirements (S102). In this embodiment, the scanning condition includes the resolution and the color information (gradation), but are not limited to. The scanning condition may include a document size. Full color may be used as the color information instead of the 256 lever color.

In this embodiment, the ROM 23 stores a plurality of types of specific documents, the limited requirements required by the respective specific documents, and the scanning condition conforming to the limited requirements and used for scanning the specific document. Specifically, the specific documents include a national tax related document, a fixed asset document, and any type of document which needs a limited requirement for scanning. The limited requirement has a limited resolution, a limited gradation, and limited color information related to the type of the specific document. For example, as the limited requirement for the national tax related document, the ROM 23 stores the limited requirement having a resolution of 200 dpi or higher and 256 level color or more. As the limited requirement for the fixed asset document, the ROM 23 stores the limited requirement having a resolution of 400 dpi or higher and 256 level or more.

The scanning condition is actually used for scanning the original document, and has a scanning resolution, a scanning gradation, and scanning color information used for scanning the original document. The ROM 23 stores the scanning condition having a resolution of 300 dpi and 256 levels for each RGB colors as the scanning condition for the national tax related document. The ROM 23 stores the scanning condition having a resolution of 400 dpi and 256 levels for each RGB colors as the scanning condition for the fixed asset document. The ROM 23 further stores identify conditions for determining whether the original document is the specific document.

In the step S102, a determination is made whether the entered scanning condition satisfies all the limited requirements for the respective specific document. The limited requirements for the specific documents are read out from the ROM 23. The entered resolution is compared with the maximum limited resolution required for complying with the minimum resolution for the specific documents. Further, the entered gradation is compared with the maximum gradation required for complying the minimum gradation for the specific documents. Thus, two types of determination are made whether the entered resolution is equal to or more than the required maximum limited resolution, and whether the entered gradation is equal to or more than the required maximum gradation. In other words, the determination is made whether the entered scanning condition satisfy all the limited requirements for the specific documents (S102).

If the entered resolution is determined to be equal to or more than the required maximum limited resolution, and the entered gradation is determined to be equal to or more than the required maximum gradation (S102: Yes), then the process advances to S103 to cause the scanning unit 29 to scan the original document with the current entered scanning condition without changing thereof (S103).

If the entered scanning condition does not satisfy the limited requirements for all the specific documents (S102: No), the scanning unit 29 scans the original document with an initial scanning condition to produce initial image data (S104). In other words, the original document is pre-scanned. In this case, for example, the initial scanning condition is typically used by a general optical character recognition (OCR), and has a monochrome mode, a lower resolution than the entered resolution read in S101 (an initial resolution), and a lower gradation than the entered gradation read in S101 (an initial gradation). The initial scanning condition has been stored in the ROM 23. Therefore, the pre-scan is completed in a relatively shorter time period than the scan with the entered scanning condition. The CPU 25 stores the initial image data obtained by pre-scanning in the RAM 24, and then performs an OCR procedure on the initial image data (S105).

The OCR procedure is performed by applying the well-known optical character recognition technology to the initial image data. In this procedure, the initial image data is compared with a plurality of patterns which have already been stored in the ROM 23. If a part of the initial image data matches one of the patterns, the character or the character code corresponding to the matched pattern is then extracted from the initial image data. The ROM 23 stores the keyword corresponding to the respective specific documents and used as the identify condition for identifying whether the original document is the specific document. Specifically, one or more keywords are stored for each specific document. For example, the keywords "receipt" and "contract document" are stored for identifying the national tax related document. The keywords "receipt" and "estimation sheet" are stored for identifying the fixed property related document. Some keywords may overlap between several different specific documents.

The CPU 25 determines whether the characters extracted by the OCR procedure match at least one of the keywords identifying any specific document (S106). If the extracted characters do not match any keyword for the specific document (S106: No), the determination is made that the original document is not the specific document. The scanning process then proceeds to S103 to cause the scanning unit 29 to scan the original document with the entered scanning condition.

If the extracted characters match any keyword for the specific document (S106: Yes), the determination is made that the original document is the specific document. Next, the process advances to S107 to determine whether more than one specific documents include the matched keyword. If there is only one specific document including the matched keyword (S107: No), the process goes to S108.

Figure 3:
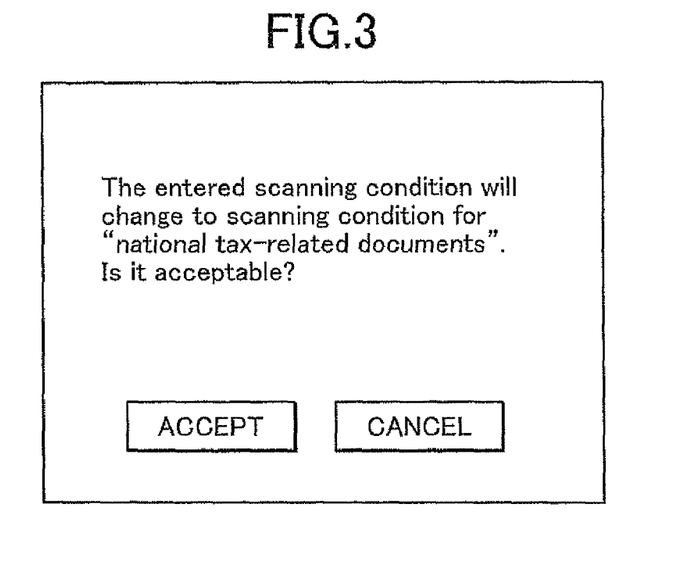
FIG. 3 is a view showing a confirmation screen.

In S108, a confirmation screen is displayed on the display unit 27, as shown in FIG. 3. The confirmation screen asks the user whether the entered scanning condition is changed to the scanning condition for the specific document which has been identified in S107. By means of the confirmation screen, the user selects one of "accept" and "cancel" through the operation unit 21. If "cancel" is selected by the user (S109: Yes), the scanning process proceeds to S103. The Scanning unit 29 scans the original document with the current entered scanning condition without changing the scanning condition.

On the other hand, if "accept" is selected by the user (S109: No), the process goes to S110 and the scanning condition is then changed to the scanning condition for the specific document identified in S107. In S110, the scanning unit 29 scans the original document with the scanning condition for the specific document (S110).

As to S108, if the scanning command has been entered from the computer 10, the confirmation screen is displayed on the display unit 12 of the computer 10 instead of the printer 20.

Figure 4:
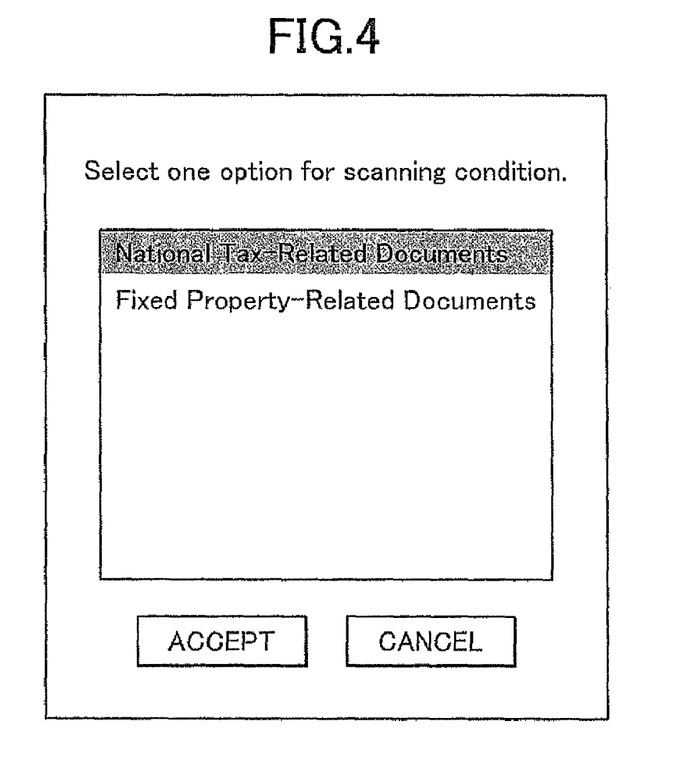
FIG. 4 is a view showing a selection screen.

If there are several specific documents having the matched keyword (S107: Yes), the process goes to the S111. In S111, a selection screen is displayed on the display unit 27, as shown in FIG. 4. The selection screen shows potential some types of specific documents. The selection screen asks the user to select one of the specific document types (S111). On the selection screen, the potential types of specific documents having the matching keyword are listed. The user can select one type of specific document from the list, using the operation unit 21. If "cancel" is selected on the selection screen case (S112: Yes), the process proceeds to S103. The Scanning unit scans the original document with the entered scanning condition. On the other hand, if the "accept" is selected (S112: No), the entered scanning condition is changed to the scanning condition for the selected specific document. The process then goes to S113, and the scanning unit 29 scans the original document with the changed scanning condition for the selected specific document (S113).

As to S111, if the scanning command has been entered from the computer 10, the selection screen is displayed on the display unit 12 of the computer 10 instead of the printer 20.

In S111, if there are several specific documents having the matched keyword, the potential types of the specific documents may be displayed in the order of the number of matched keywords. Alternatively, the specific document having the largest number of matched keywords may be automatically selected.

The image data produced in S103, S110, or S113, is transmitted to the output destination designated in the settings values such as the computer 10.

As described above, according to this embodiment, if the original document is determined as the specific document, the original document is scanned with the scanning condition which is suitable for the specific document. Therefore, even if the original document is the specific document, such a specific document can be scanned with a suitable scanning condition.

Furthermore, when the specific document is to be scanned, and the entered scanning condition does not conform to the limited requirement required by the specific document, the specific document is scanned with the scanning condition which conforms to the limited requirement of the specific document, instead of the entered scanning condition. Therefore, erroneous setting for the scanning condition for the original document can be reduced.

If the entered scanning condition satisfies the limited requirements for the specific documents, the original document is scanned with the entered scanning condition. In this case, the determination procedure by the CPU 25 as to whether the original document is the specific document (S104 to S106) can be omitted. Therefore, the scanning process is completed in a shorter time period.

The limited requirement for the specific document may sometimes need a color-scanning. In this case, the color-scanning is performed, even when the entered scanning condition includes a monochrome mode. This prevents an original document to be color-scanned from being monochrome-scanned by mistake.

Furthermore, if the original document is determined as the specific document, the user can select whether the scanning condition should be changed (S108, S109). The original document can be scanned with the scanning condition according to the user's request.

Furthermore, if there are several potential specific documents for the original document, the user can select one of several scanning conditions (S111, S112). The original document can be scanned with the scanning condition according to the user's request.

Furthermore, the determination as to whether the original document is the specific document can be made, based on the characters extracted from the initial image data produced by the pre-scanning (S106). The original document can be scanned with the scanning condition according to the user's request. Further, the determination as to whether the original document is the specific document is made with high precision.

Whether the original document is the specific document is determined based on the pre-scanned image data with the initial scanning condition which is used for every pre-scanning. The initial scanning condition is set in order to have monochrome color, a lower resolution, and a lower gradation than the entered resolution and gradation. Accordingly, the same initial scanning condition is used for every pre-scanning so that the original document can be determined with higher precision. Further, the pre-scanning is performed in a shorter time period than the scanning by the entered scanning condition.

Figure 5:
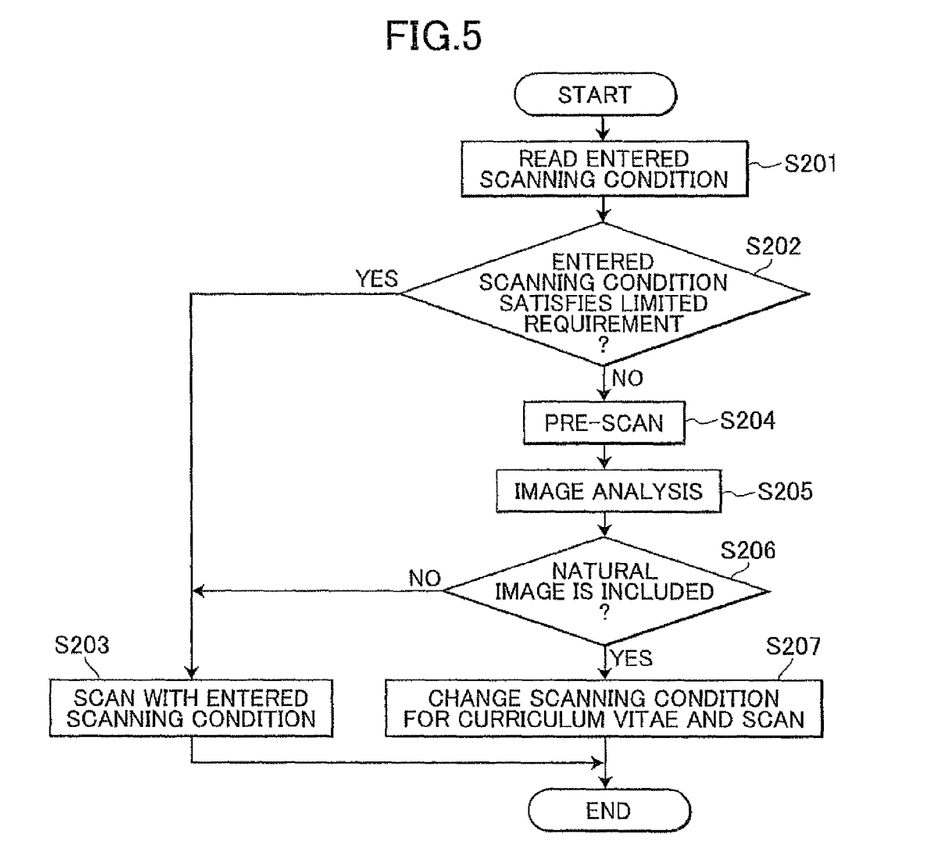
FIG. 5 is a flowchart showing a scanning process including a step which determining whether the original document includes an natural image.

Next, a second embodiment of the present invention will be described with reference to FIG. 5. In this embodiment, the ROM 23 stores information of a "curriculum vitae" as the specific document. The ROM 23 further stores the limited requirement required by the curriculum vitae (resolution, gradation, and color information) and the scanning condition conforming thereto. The limited requirement for the curriculum vitae has a resolution of 300 dpi or higher and a gradation of 256 level color or more. The scanning condition for the curriculum vitae has a resolution of 600 dpi and a gradation of 256 level color or more.

As the scanning process is started, the CPU 25 reads the setting values which have been set for scanning (S201). The CPU 25 then determines whether the entered scanning condition included in the setting value satisfies the limited requirement (S202).

In this embodiment, what the CPU 23 has to do is to determine whether the entered scanning condition satisfy the scanning condition for the curriculum vitae. It should be noted that the limited requirement for the curriculum vitae is required to define the scanning condition for the curriculum vitae.

If the entered scanning condition satisfies the limited requirement (S202: Yes), the original document is scanned with the entered scanning condition (S203). On the other hand, if the entered scanning condition does not satisfy the limited requirement (S202: No), the original document is pre-scanned (S204). In this case, pre-scanning is performed at a resolution lower than the resolution of the entered scanning condition, which is generally available for a typical OCR procedure, and with a gradation for RGB color lower than the gradation of the entered scanning condition. The resolution and gradation used for pre-scanning are stored in the ROM 23.

Next, the initial image data produced by the pre-scanning is analyzed (S205), and the CPU 25 determines whether the initial image data includes a natural image (S206). Specifically, for example, the color distribution (the number of pixels for each color) of the initial image data is analyzed. If the color distribution changes more gradually than a reference value, the determination is made that the initial image data includes a natural image. If it is determined that the image data does not include the natural image based on the analysis (S206: No), it is determined that the original document is not a "curriculum vitae." In this case, the process goes to S203, the original document is scanned with the entered scanning condition (S203). On the other hand, if it is determined that the initial image data has the natural image (S206: Yes), this result means that the original document is the curriculum vitae. In this case, the process goes to S207. And, the entered scanning condition is replaced with the scanning condition for the curriculum vitae which has been read from the ROM 23. The original document is scanned with the scanning condition for the curriculum vitae (S207).

According to this embodiment, if the original document such as a curriculum vitae, a license, or various application forms includes a photograph as the natural image, the scanning condition conforming to the limited requirement for the specific document including the photograph is used for scanning the original document. This prevents the photograph in the original document from being scanned at a lower resolution by mistake.

Furthermore, the analysis of the color distribution of the initial image data results in the determination as to whether the initial image data includes the natural image. Accordingly, the determination as to whether the initial image data includes the natural image can be made precisely.

In the image analysis procedure, as the factor to determine whether the original document is the specific document, the CPU 25 can determine the size of the original document. Alternatively, the CPU 25 can determine the size or the position of the natural image in the original document.

Figure 6:
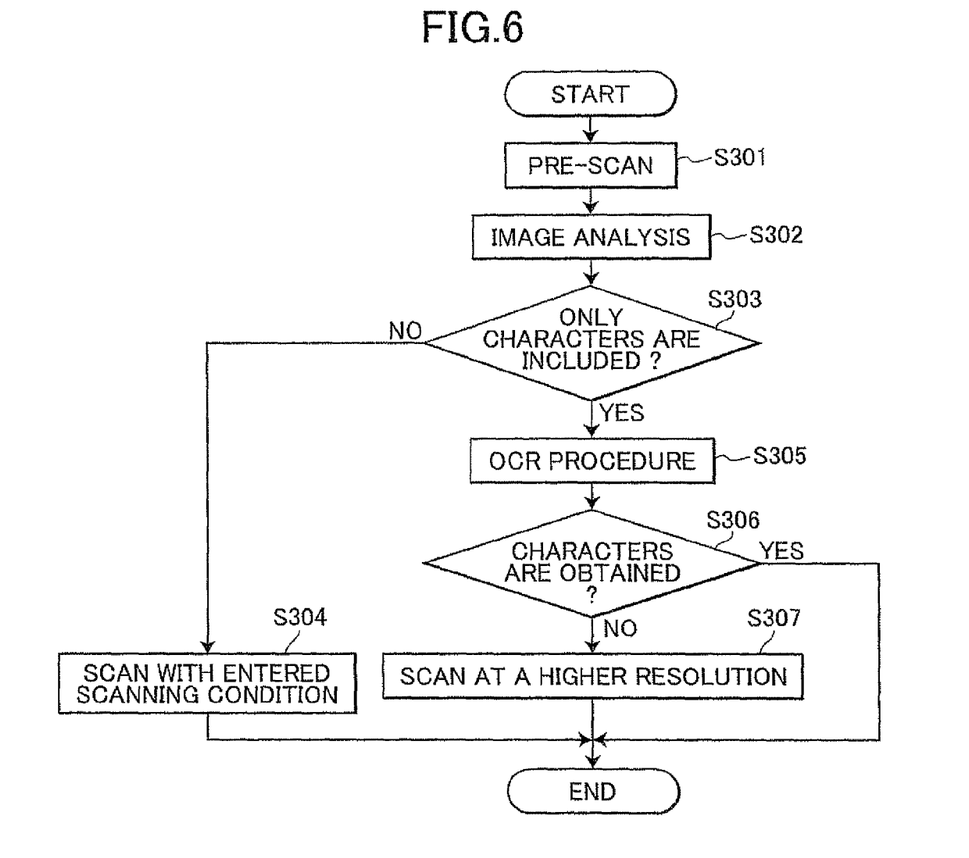
FIG. 6 is a flowchart showing a scanning process including a step which determining whether the original document includes a character.

Next, a third embodiment of the present invention will be described with reference to FIG. 6. In this embodiment, the ROM 23 stores a "document text" (an address book) as the specific document. The ROM 23 further stores the limited requirement required for the document text and the scanning condition used for scanning the document text. The limited requirement for the document text requires monochrome-scanning. The scanning condition for the document text includes a resolution of 300 dpi.

As a scanning process is started, the CPU 25 pre-scans the original document with the initial scanning condition to produce an initial image data (S301). In this case, the initial scanning condition includes a monochrome mode and the minimum resolution required for determining whether the initial image data includes a natural image. The initial scanning condition used by the pre-scanning is stored in the ROM 23. The initial resolution of the initial scanning condition is lower than the resolution of the scanning condition for the document text, 300 dpi, which has been stored in the ROM 23.

Next, the CPU 25 analyzes the initial image data (S302), and determines whether the initial image data is composed of only characters. Specifically, for example, the color distribution of the initial image data is analyzed. If the color distribution of the initial image data has the section in which the change of the color distribution is more gradual than the reference value, this feature means that the initial image data may include the natural image. Therefore, the CPU 25 determines that the initial image data is not composed of only characters. Otherwise, the CPU 25 determines that the initial image data is composed of only characters.

If the analysis result shows that the image data is not composed of only characters (S303: No), the CPU 25 determines that the original document is not the document text. The process goes to S304, where the original document is scanned with the initial scanning condition. On the other hand, the CPU determines that the image data is composed of only characters (S303: Yes), this result means that the original document is the document text. The process goes to S305. In S305. the OCR procedure is performed on the initial image data. In the OCR procedure, the initial image data is compared with the pattern which has already been stored in the ROM 23. Accordingly, matched characters (keyword) included in the initial image data are extracted.

Next, the CPU 25 determines whether the characters have been extracted from the initial image data by means of the OCR procedure (S306). If the characters are extracted (S306: Yes), the scanning process is terminated. Specifically, the initial image data produced by the pre-scanning is transmitted to the output destination such as the computer 10. On the other hand, if the characters are not extracted (S306: No), the process goes to S307. In S307, the scanning condition for the document text is read out from the ROM 23, and the original document is scanned at a resolution higher than the initial resolution and in the monochrome mode (S307).

In this embodiment, if the characters in the initial image data cannot be recognized, the scanning is performed at a higher resolution than the initial resolution. Accordingly, if the original document is the document text, this process readily ensures the extraction of characters from the image data.

Furthermore, if the pre-scanning is performed with a different scanning condition from the initial scanning condition and the characters in the image data are recognized, the scanning process is terminated without performing further scanning. This steps reduces the number of scanning to be performed.

Also in this embodiment, even if the color mode is set for the scanning, the original document is scanned in a monochrome mode. This steps reduces the size of the image data obtained by the scanning.

In the above embodiment, a symbol and a graphic as well as the character can be extracted in the image data. If the symbol or the graphic is not extracted by the pre-scanning, the original document can be scanned at a higher resolution than the initial resolution employed for the pre-scanning.

Furthermore, if the characters are not extracted by the scanning at the higher resolution, the scanning may be repeatedly performed at a further higher resolution. Accordingly, the character, the symbol, and the graphic can be extracted precisely by the scanning process, if the image data includes at least one of the character, the symbol, and the graphic Next, a fourth embodiment of the present invention will be described with reference to FIG. 7. In this embodiment, the ROM 23 stores a plurality of types of bar codes such as "CODE39", "JAN13", or "POSTNET", each of the bar code specifying the corresponding specific document. The ROM 23 further stores the information related to the data format corresponding to each type of bar code. The ROM 23 stores the scanning condition conforming to the limited requirements for the respective bar code documents.

Figure 7:
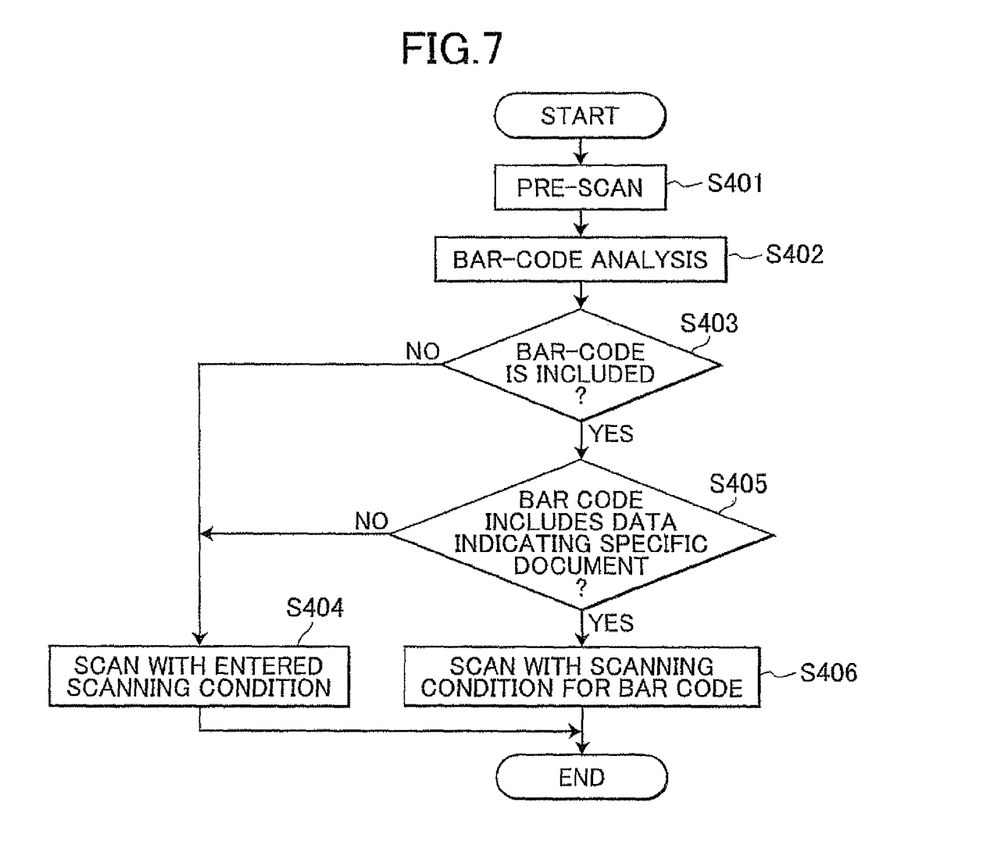
FIG. 7 is a flowchart showing a scanning process including a step which determining whether the original document includes a bar code indicating that the original document is a specific document.

As a scanning process is started, the CPU 25 pre-scans the original document with the initial scanning condition to produce an initial image data (S401). In this case, the initial scanning condition includes a monochrome mode and the minimum resolution required for determining whether the bar code in the image data indicates the specific document. The initial scanning condition is stored in the ROM 23. Next, the CPU 25 analyzes the initial image data (S402) and then determines whether a bar code is included in the initial image data (S403). If the image data has no bar code (S403: No), the CPU 25 determines that the original document is not the specific document specified by the bar code. The process goes to S304. In S304, the original document is scanned with the entered scanning condition through the operating unit 21 or the computer 10 (S404).

Furthermore, if the initial image data has the bar code (S403: Yes), the CPU 25 determines whether the bar code in the initial image data includes data indicating the specific document (S405). If it is determined that the bar code in the initial image data does not include the data indicating the specific document (S405: No), it is determined that the original document is not the specific document specified by the bar code. The process goes to S404, the original document is scanned with the entered scanning condition.

On the other hand, if the bar code in the initial image data includes the data indicating the specific document (S405: Yes), this means that the original document is the specific document specified by the bar code in the initial image data. In this case, the process goes to S406. In S406, the scanning condition related to the specific document specified by the bar code is read from the ROM 23. The original document is scanned with the scanning condition (S406).

Figure 8:
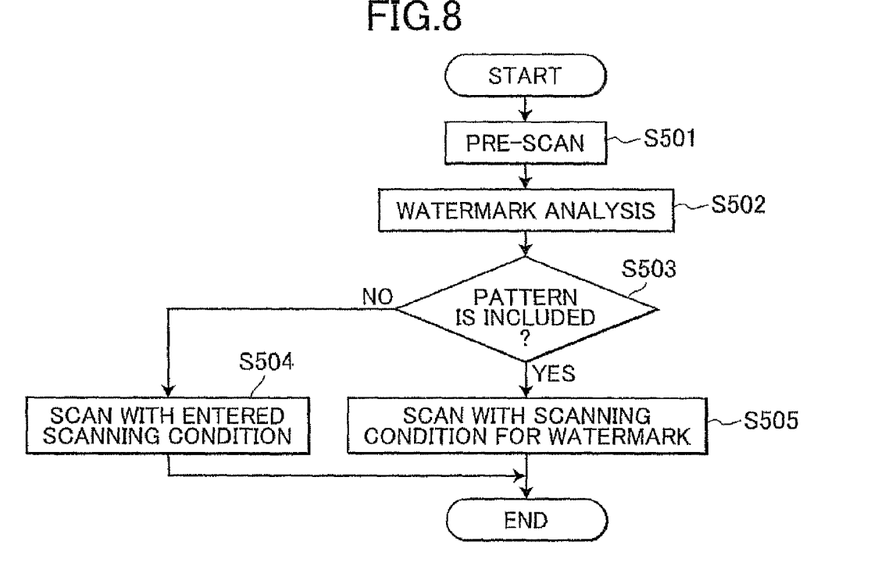
FIG. 8 is a flowchart showing a scanning process including a step which determining whether the original document includes a watermark pattern.

Next, a fifth embodiment of the present invention will be described with reference to FIG. 8. In this embodiment, the scanning unit 29 is a transmission-type of scanner. The ROM 23 stores the document having a watermark as the specific document, and the specific watermark pattern corresponding to the document having the watermark. The ROM 23 further stores the scanning condition conforming to the limited requirement for the document having the watermark pattern.

As the scanning process is started, the CPU 25 pre-scans the original document with the initial scanning condition to produce an initial image data (S501). In this case, the initial scanning condition has a monochrome mode and the minimum resolution required for determining whether the image data includes the specific watermark pattern. The initial scanning condition is stored in the ROM 23. Next, the CPU 25 analyzes the initial image data (S502) and determines whether the image data includes the specific watermark pattern (S503). If the image data does not include the specific watermark pattern (S503: No), the CPI 25 determines that the original document is not the specific document having the watermark pattern. Therefore, the process goes to S504. In S504, the original document is scanned with the entered scanning condition which is set at the beginning of the process.

In S503, the watermark pattern contained in the initial image data is compared with the watermark patterns stored in the ROM 23. If the watermark pattern in the initial image data matches one of the watermark patterns stored in the ROM 23, the CPU 25 determines that the initial image data includes the specific watermark pattern.

On the other hand, if the initial image data includes one of the specific watermark patterns (S503: Yes), the CPU 25 determines that the original document is the specific document having the watermark. The process then goes to S505. In S505, the scanning condition related to the specific document having the watermark is read from the ROM 23. Then, the original document is scanned with the scanning condition to produce the image data (S505).

Figure 9:
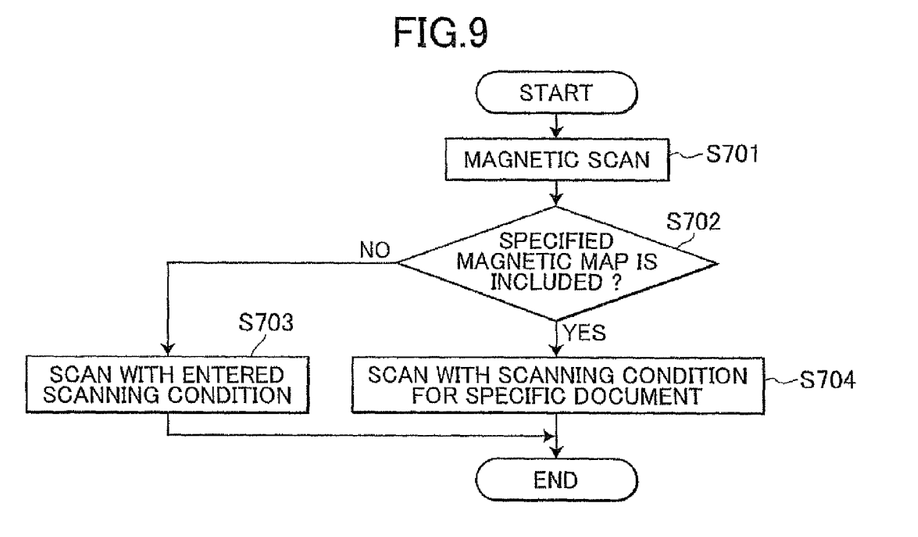
FIG. 9 is a flowchart showing a scanning process including a step which determining whether the original document includes a magnetic map.

Next, a sixth embodiment of the present invention will be described with reference to FIG. 9. In this embodiment, a magnetic type of scanner is employed to determine whether the original document is the specific document. The magnetic type of scanner, for example, can be provided next to the head of the scanning unit 29.

The magnetic type of scanner scans the original document in synchronization with the operation of the head of the scanning head 29 to read the magnetism of the magnetic material contained in the recording material including toner or ink which is used for recording information on the original document. Thus, the image data indicating the distribution of the magnetic material contained in the original document scanned magnetically by the magnetic scanner (designated as magnetic map information hereinafter) can be produced. The ROM 23 stores the magnetic map information related to the specific document, and the scanning condition conforming to the limited requirement for the specific document.

As the scanning process is started, the CPU 25 magnetically scans the original document with the initial scanning condition to produce a magnetic map information (s701). The CPU 25 then compares the magnetic map information with the magnetic map information for the specific document (S702). If the magnetic map information does not match the magnetic map information for any one of the specific documents (S702: No), the CPU 25 determines that the original document is not the specific document. The process then goes to S703. In S703, the original document is scanned with the entered scanning condition which has been set at the beginning of the process.

On the other hand, if the scanned magnetic map information matches the magnetic map information for one of the specific documents (S702: Yes), the CPU 25 determines that the original document is the specific document. The process then goes to S704. In S704, the scanning condition for the specific document is read from the ROM 23. And, the original document is scanned with the scanning condition instead of the entered scanning condition (S704).

As described above, the original document can be scanned with the suitable scanning condition according to the determined type of the specific document to produce the image data. Depending on the application of the image data, the image data may be stored in the RAM 24 or transmitted to the computer 10.

The present invention is not limited to the above embodiments and the accompanying drawings. For example, the following modifications are within the scope of the present invention.

In another embodiment, an information processor connected to the image scanning device may determine whether the original document is the specific document, instead of the image scanning device such as the printer 20. Specifically, for example, as shown in FIG. 1, after the scanning command is transmitted from the computer 10 to the printer 20, the initial image data by the pre-scanning is sent to the RAM 14 of the computer 10. The CPU 15 recognizes a character, a symbol, or a graphic. If the CPU 15 determines that the original document is the specific document, the scanning unit 29 may scan the original document with an appropriate scanning condition for the specific document.

In another embodiment, the screen for enabling the user to select whether the scanning condition should be changed may be displayed while the scanning unit 29 is scanning. Alternatively, before the scanning process starts, the user can decide whether the scanning condition should be changed, preparing for determining that the original document is the specific document. In the actual scanning, the process can be advanced according to the user's decision.

In another embodiment, the image scanning device may include a connector for connecting a storage media such as a USB memory, so that the image data can be stored in the storage media connected to the image scanning device. Furthermore, the image data obtained by the scanning can be printed out on a sheet by the printing unit 22.

The present invention is applicable to the image scanning device which scans an original document with the scanning condition stored in a ROM to produce image data, determines a type of the original document based on the image data by a determination unit, and scans the original document with a suitable scanning condition to the determined type of the original document. In this case, the image scanning device does not receive any scanning condition entered by the user.

What is claimed is:

1. An image scanning device comprising:
   a scanning unit that scans an original document with a scanning condition to produce image data;
   a first storage unit that stores a specific condition used by the scanning unit for scanning a specific document, the specific condition including a limited requirement required by the specific document, and a limited scanning condition conforming to the limited requirement;
   a first determination unit that determines whether the scanning condition satisfies the limited requirement for the specific document;
   a control unit that causes the scanning unit to scan the original document with the scanning condition, if the first determination unit determines that the scanning condition satisfies the limited requirement for the specific document, the control unit causing the scanning unit to scan the original document with an initial condition to produce initial image data if the first determination unit determines that the scanning condition does not satisfy the limited requirement for the specific document; and
   a second determination unit that determines based on the initial image data whether the original document is the specific document, wherein
   the control unit causes the scanning unit to scan the original document with the scanning condition, if the second determination unit determines that the original document is not the specific document, and
   the control unit reads the specific condition from the first storage unit and causes the scanning unit to scan the original document with the limited scanning condition if the second determination unit determines that the original document is the specific document.

2. The image scanning device according to claim 1, further comprising:
   a user setting unit that receives the scanning condition set by a user.

3. The image scanning device according to claim 2, wherein the specific condition includes a plurality of specific conditions, the plurality of specific conditions conforming to a limited requirement for each of a plurality of different specific documents.

4. The image scanning device according to claim 3, wherein the scanning condition includes a user setting resolution, one of the plurality of specific conditions is for the specific document having a photograph, and includes a photograph resolution, the second determination unit determines whether the original document is the specific document having the photograph, the control unit reads the one of the plurality of specific conditions, and then causes the scanning unit to scan the original document with the one of the plurality of specific conditions, if the first determination unit determines that the user setting resolution does not satisfy the photograph resolution and the second determination unit determines that the original document is the specific document having the photograph, wherein the one of the plurality of specific conditions is the scanning condition conforming to the limited requirement for the specific document including the photograph.

5. The image scanning device according to claim 3, wherein the scanning condition includes a color information having one of polychrome and monochrome, one of the plurality of specific conditions is for the specific document in color, the control unit causes the scanning unit to scan the original document with the one of the plurality of specific conditions, if the second determination unit determines that the scanning condition includes the color information having monochrome and the second determination unit determines that the original document is the specific document including the color information having monochrome.

6. The image scanning device according to claim 3, further comprising:

a second selection unit that selects one of the plurality of scanning conditions, wherein if the second determination unit determines that the original document is one of the plurality of specific documents, the second selection unit selects one of the plurality of scanning conditions corresponding to the determined one of the plurality of specific documents.

7. The image scanning device according to claim 2, further comprising:

a first selection unit that selects one of the specific condition and the scanning condition for scanning the original document, if the second determination unit determines that the original document is the specific document.

8. The image scanning device according to claim 1, wherein the initial image data has a color distribution, and the second determination unit performs the determination based on the color distribution.

9. The image scanning device according to claim 1, further comprising an identification unit that identifies one of a character, a symbol, and a graphic included in the initial image data, wherein the initial condition includes an initial resolution, the control unit causes the scanning unit to scan the original document with a higher resolution than the initial resolution, if the second determination unit determines that the original document is the specific document and the identification unit does not identify any one of the character, the symbol, and the graphic.

10. The image scanning device according to claim 9, wherein the control unit finishes the scan by the scanning unit, if the second determination unit determines that the original document is the specific document, and the identification unit identifies at least one of the character, the symbol, and the graphic.

11. The image scanning device according to claim 1, further comprising:

an identification unit that identifies at least one of a character, a symbol, and a graphic included in the initial image data; and a second storage unit that stores a character, a symbol, and a graphic included in the specific document, wherein the second determination unit determines that the original document is the specific document, if one of the character, the symbol, and the graphic stored in the second storage unit corresponds to the at least one of the character, the symbol, and the graphic identified by the identification unit.

12. An image scanning system, comprising:

an image scanning device having a scanning unit that scans an original document with a scanning condition set by a user to produce image data; and an information processing device that communicates with the image scanning device bidirectionally, the information processing device comprising:

a storage unit that stores a specific condition used by the scanning unit for scanning a specific document, the specific condition including a limited requirement required by the specific document, and a limited scanning condition conforming to the limited requirement;

a first determination unit that determines whether the scanning condition satisfies the limited requirement for the specific document;

a control unit that causes the scanning unit to scan the original document with the scanning condition, if the first determination unit determines that the scanning condition satisfies the limited requirement for the specific document, the control unit causing the scanning unit to scan the original document with an initial condition to produce initial image data if the first determination unit determines that the scanning condition does not satisfy the limited requirement for the specific document; and a second determination unit that determines based on the initial image data whether the original document is the specific document, wherein the control unit causes the scanning unit to scan the original document with the scanning condition, if the second determination unit determines that the original document is not the specific document; and the control unit reads the specific condition from the storage unit and causes the scanning unit to scan the original document with the limited scanning condition if the second determination unit determines that the original document is the specific document.

13. An image scanning device, comprising:

a scanning unit that scans an original document with a scanning condition to produce image data;

a user setting unit that receives the scanning condition set by a user, the scanning condition being used by the scanning unit for scanning the original document;

a storage unit that stores a specific condition used by the scanning unit for scanning a specific document, the specific condition including a limited requirement required by the specific document, and a limited scanning condition conforming to the limited requirement;

a first determination unit that determines whether the scanning condition satisfies the limited requirement for the specific document;

a control unit that causes the scanning unit to scan the original document with the scanning condition if the first determination unit determines that the scanning condition satisfies the limited requirement for the specific document, the control unit causing the scanning unit to scan the original document with an initial condition to produce initial image data, if the first determination unit determines that the scanning condition does not satisfy the limited requirement for the specific document; and a second determination unit that determines, based on the initial image data, whether the original document is the specific document; wherein the control unit causes the scanning unit to scan the original document with the scanning condition, if the second determination unit determines that the original document is not the specific document; and the control unit reads the specific condition from the first storage unit and then causes the scanning unit to scan the original document with the limited scanning condition if the second determination unit determines that the original document is the specific document.

14. The image scanning device according to claim 13, wherein the second determination unit determines whether the initial image data includes a keyword related to the specific document, and the second determination unit determines that the original document is the specific document if the second determination unit determines that the initial image data includes the keyword.

15. The image scanning device according to claim 13, wherein the second determination unit determines whether the initial image data includes natural image related to the specific document, and the second determination unit determines that the original document is the specific document if the second determination unit determines that the initial image data includes the natural image.

16. The image scanning device according to claim 13, wherein the second determination unit determines whether the initial image data includes a watermark pattern related to the specific document, and the second determination unit determines that the original document is the specific document if the second determination unit determines that the initial image data includes the watermark pattern.

17. The image scanning device according to claim 13, wherein the second determination unit determines whether the initial image data includes a bar code related to the specific document, and the second determination unit determines that the original document is the specific document if the second determination unit determines that the initial image data includes the bar code.

18. The image scanning device according to claim 13, wherein the second determination unit determines whether the initial image data includes a magnetic map related to the specific document, and the second determination unit determines that the original document is the specific document if the second determination unit determines that the initial image data includes the magnetic map.

19. An image scanning system comprising:

an image scanning device having a scanning unit that scan an original document with a scanning condition to produce image data; and an information processing device communicating with the image scanning device bidirectionally, the information processing device comprising a user setting unit that receives a user setting condition set by a user;

a storage unit that stores a specific condition used by the scanning unit for scanning a specific document, the specific condition including a limited requirement required by the specific document, and a limited scanning condition conforming to the limited requirement;

a first determination unit that determines whether the scanning condition satisfies the limited requirement for the specific document;

a control unit that causes the scanning unit to scan the original document with the scanning condition, if the first determination unit determines that the scanning condition satisfies the limited requirement for the specific document, the controlling unit causing the scanning unit to scan the original document with an initial condition instead of the scanning condition to produce initial image data if the first determination unit determines that the scanning condition does not satisfy the limited requirement for the specific document; and a second determination unit that determines based on the initial image data whether the original document is the specific document, wherein the control unit causes the scanning unit to scan the original document with the scanning condition, if the second determination unit determines that the original document is not the specific document; and the control unit reads the specific condition from the first storage unit and causes the scanning unit to scan the original document with the limited scanning condition if the second determination determines that the original document is the specific document.

* * * * *